Feb. 11, 1930.                F. WELCH                 1,746,752
          BELT AND THE LIKE AND METHOD OF MAKING SAME
                       Filed Jan. 9, 1928
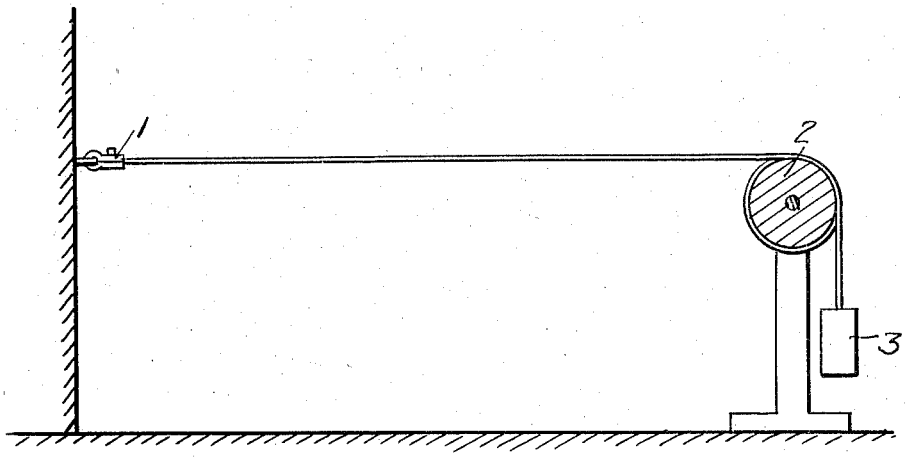
FIG. 1.
      
FIG. 2.      FIG. 3.      FIG. 4.
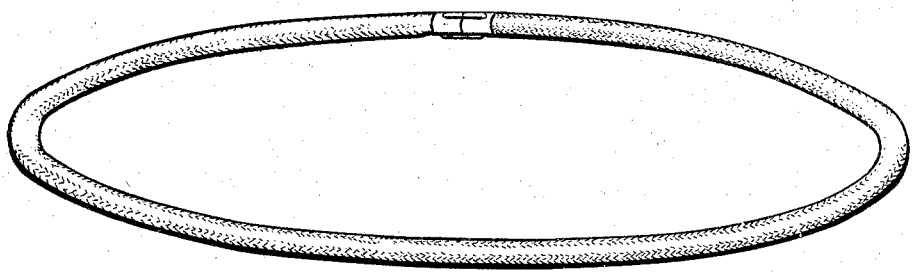
FIG. 5.
INVENTOR
F. WELCH.
BY
ATTORNEYS.

Patented Feb. 11, 1930

1,746,752

UNITED STATES PATENT OFFICE

FRANK WELCH, OF TORONTO, ONTARIO, CANADA

BELT AND THE LIKE AND METHOD OF MAKING SAME

Application filed January 9, 1928. Serial No. 245,516.

My invention relates to improvements in belts and the like and the method of making same, and the object of the invention is to devise a belt for light driving purposes particularly of the round type in cross-section, which may be manufactured more cheaply than the present belt made of leather and which will be stronger and have a greater flexibility and wear than such belt and not so liable to slip on the driving and driven pulleys.

My invention consists of a belt made of a round braided fabric, preferably with an inner braided core which is treated and stretched in the method which I shall presently describe.

Fig. 1 is a diagrammatic view showing the first step of my method.

Figs. 2, 3 and 4 are fragmentary views showing the various steps in the treatment.

Fig. 5 is a view of the belt complete.

Heretofore for light driving purposes belts have been made of leather round in cross-section. It has frequently been found difficult to get hides of the requisite thickness and quality to make an absolutely satisfactory belt. Besides this, such belts made of leather will stretch, crack and break no matter what the quality of the leather may be and consequently the life of the belt is of short duration. In addition to this, the flexibility and grip upon the pulleys is not as efficient as it should be.

My braided fabric belt is devised to obviate these objections and the method by which I produce the same is as follows.

First, I preferably weave a hollow braided fabric in tubular form and preferably insert therein a hollow braided tubular cord of any desired length. I then stretch these two lengths of braided fabric in any suitable manner and hold them so stretched. In Figure 1 I show one means of doing so. I attach one end of the length of fabric to a suitable fastener 1 and pass the other end over a pulley 2 and attach a weight 3 to this end. This will serve to hold the fabric stretched.

Before the period that it is so held I apply an adhesive liquid thereto in such a manner as to thoroughly permeate the strands of the fabric as well as fill up the interstices. The liquid I preferably use is a banana liquid (amyl acetate), but any adhesive such as rubber starch can be used to obtain the results.

Providing the belt is soaked with the liquid and in a stretched state it is allowed to dry in such state so that the adhesive, when dry, will hold the braid and belt and retain it in its stretched state.

After the belt is dry it is faced with a composition to prevent it from fraying by friction and also to give it a grip to improve its driving qualities.

The composition which I preferably use is preferably a combination of beeswax one-half pound, resin one-half ounce, and turpentine one-half pint. Other substances may be used such as paraffin, tallow, etc. The belt is then allowed to dry thoroughly and then polished.

By treating, stretching, drying and polishing the braided fabric as described, it is reduced to half of its original size and forms an excellent belt stronger than leather, devoid of its stretching qualities, and perfectly round, durable, and of great flexibility.

Although I describe the belt as made with an inner core it is not absolutely necessary that it be so made. Again, various yarns may be used such as cotton and linen. The method of stretching is, of course, not essential nor are the liquids used in its treatment.

Although I describe my tubular fabric as adapted for belts it will be, of course, understood that it may be adapted for like purposes.

What I claim as my invention is:

1. The method of producing a belt or the like, consisting in stretching a braided fabric of suitable length and diameter and applying an adhesive thereto so as to thoroughly permeate the strands of the fabric and the interstices between the strands, then drying, then applying a suitable surfacing liquid, then drying again and imparting thereto a suitable polish.

2. As a new article of manufacture, a tubular braided fabric of suitable material in stretched form and having the strands permeated and the interstices between the strands filled with an adhesive liquid, and the surface treated with a suitable composition and polished.

3. As a new article of manufacture, a tubular braided fabric of suitable material in stretched form and having the strands permeated and the interstices between the strands filled with amyl acetate and the surface treated with a suitable composition of beeswax, resin and turpentine and polished.

4. As a new article of manufacture, a tubular braided fabric of suitable material having an inner core of braided fabric both in stretched form and having the strands permeated and the interstices between the strands filled with amyl acetate and the surface treated with a suitable composition of beeswax, resin and turpentine and polished.

5. The method of producing a belt or the like consisting in providing a hollow braided fabric with a suitable braided core and then stretching such combined cover and core and applying an adhesive thereto so as to thoroughly permeate the strands of both the fabric and core and the interstices between them, then drying and then applying a suitable surfacing composition.

6. As a new article of manufacture a tubular braided fabric of suitable material having an inner core of braided fabric, both in stretched form, and having the strands and the interstices between them permeated with a suitable composition capable of retaining the fabric in its stretched form.

FRANK WELCH.